United States Patent Office 3,356,045
Patented Dec. 5, 1967

3,356,045
METHOD AND APPARATUS FOR MAKING MILK CARAMEL MASS FOR MANUFACTURING "IRIS"
Alexei Kirillovich Karpenko, Valerija Dmitrievna Bondareva, Mikhail Dmitrievich Malinin, Moisei Khaimovich Smoljanitsky, Valentina Grigorjevna Koroleva, Illarion Fedorovich Poljakov, and Vladimir Ivanovich Saveljev, Moscow, U.S.S.R., assignors to Moscowskaja Konditerskaja Fabrika "Krasny Oktjabr"
Filed Oct. 17, 1963, Ser. No. 316,826
2 Claims. (Cl. 107—4)

ABSTRACT OF THE DISCLOSURE

The production of a milk caramel mass for making "Iris" toffee-type candy in which the heating and stirring of the caramel mass is accompanied by a continuous circulation of the mass and the evaporation effected in a first stage wherein the mass is heated at a heating-steam pressure of about 3.5 atmospheres and a second stage wherein moisture is evaporated until the mass reaches the desired concentration by using the heat accumulated in the mass.

---

The present invention relates to a method of and apparatus for making candy, and more particularly to making "Iris" toffee-type caramels.

The usual practice of making "Iris" toffee-type candy involves the preparation of a milk caramel mass comprising per ton of manufactured product (approximately): 450 kg. of condensed milk, 360 kg. of granulated sugar, 250 kg. of molasses, and 45 kg. of butter. The resulting milk caramel mass with a moisture content of about 20 to 25 percent is boiled down to a moisture content of 6 to 8 percent in open boiling pans or "Soll Kocher"-type apparatus which are open-type cookers with vacuum pans thereunder. The boiled down milk caramel mass is cooled in batches on cooling plates in which cold water is circulated. At the same time the mass is stirred manually and flavoring matter in quantities of about 4 kg. per ton is added thereto. The milk caramel mass cools down to 45° C. and is then fed in 15 to 20 kg. batches manually into molding and wrapping machines.

In the above method of preparing the milk caramel mass, the moisture evaporation and the heat treatment processes take place simultaneously which interfere with controlling the processes independently of each other, and a separate control is essential to ensure high product quality and lowest possible caramel mass losses due to burning.

The essence of the present invention is directed to the concept that the heating and stirring of the milk caramel mass is attended by a continuous circulation of said mass, while its evaporation is effected in two stages, namely, a first stage wherein the mass is heated at a heating-steam pressure of the order of 3.5 atmospheres and a second stage wherein mositure is evaporated from the mass until the latter attains the desired concentration by utilizing the heat accumulated in the mass.

It is an object of the present invention to provide a continuous milk caramel mass preparation method which improves the organoleptic properties of the mass.

A further object of the present invention is to speed-up the milk caramel mass production cycle.

Still another object is to provide a continuous milk caramel mass production method that lends itself to application to automatic production lines.

Figure 1:
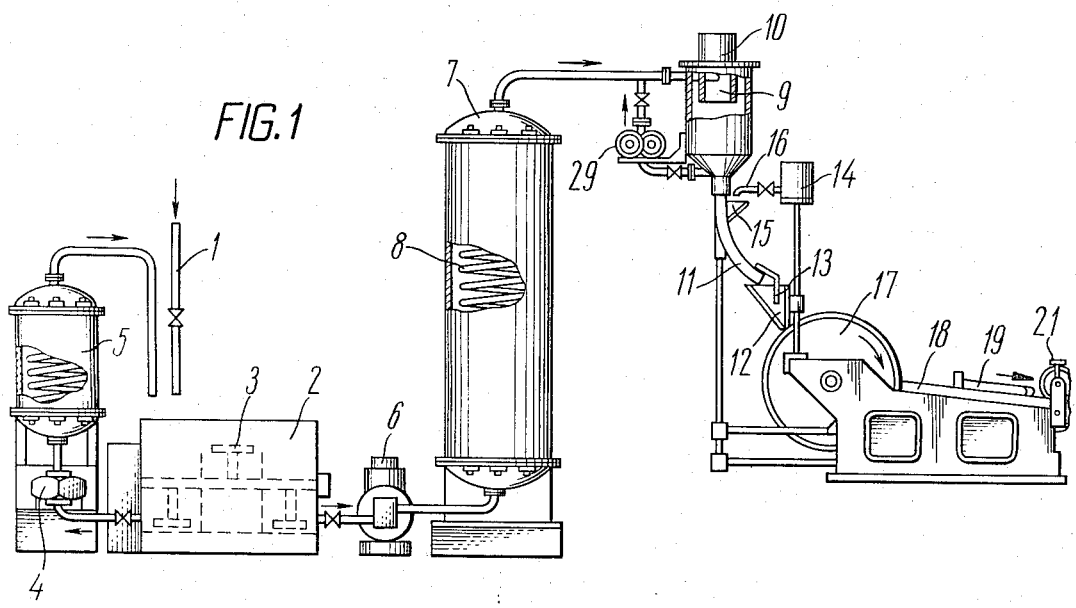
Figure 2:
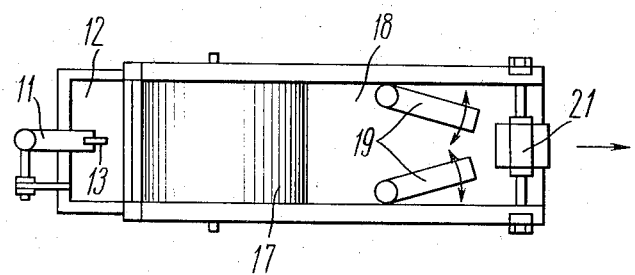
Figure 3:
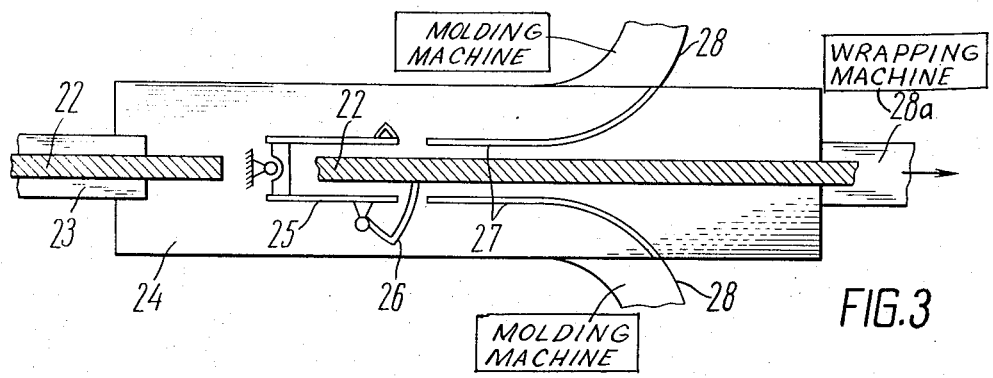

Other objects and adventages of the invention will become apparent from the following detailed description with reference to the accompaning drawings, wherein:

FIG. 1 is diagrammatic view of the present plant for making milk caramel mass for the manufacture of "Iris" toffee-type candy, FIG. 2 is a top plan view of the cooling plate provided with vanes for folding up the sheet of milk caramel mass, and FIG. 3 is a diagrammatic view of the conveyor with its distributing device for directing the caramel stick to several molding and wrapping machines.

The initial milk caramel mass is preheated by any of the conventional methods to a temperature of 60 to 70° C. The heated mass is fed through a pipeline 1 into a stirring device which consists of a compartmented collector 2 provided with stirrer means 3. The collector 2 is joined to a closed circulation system provided with a pump 4 and a unit 5 having a coil therein in which the initial mass temperature is raised to 100 to 125° C.

The mass thus heated to 125° C. is continuously removed with the aid of a ram pump 6 from the collector 2 for a subsequent evaporation. This operation is carried out in two stages. The mass is first heated in a cylindrical heat exchanger 7 which is supplied with steam at a pressure of about 3.5 atmospheres, with the mass being passed through a coil 8 therein and moisture is evaporated from the milk caramel mass in a centrifugal cyclone steam separator 9 to a moisture content of approximately 6 to 8 percent by the heat accumulated in the mass during its passage through the heater. The steam is separated and escapes from the cyclone steam separator through an inner pipe 10, while the condensed mass flows down the walls of the cyclone 9 and a bent sleeve 11 has an oscillatory motion imparted thereto by suitable means. The top end of the sleeve connected to the drain hole of the cyclone 9, and the other end carrying a rigidly attached vane 13 is positioned over a hopper 12 provided with a lateral slot in its bottom. The hopper serves for receiving the mass, blending it with flavoring matter, and distributing it over the surface of a cooling cylinder 17. The flavoring matter is fed continuously from a flavoring device 14 through a funnel 15, and a pneumatic spray nozzle 16 sprays it over the surface of the condensed mass.

The condensed flavored milk caramel mass in a uniform layer in the shape of a wide band is continuously fed through the slot in the hopper 12 onto a cooling device consisting of the cylinder 17 having cold water flowing therein and a cooling plate 18 equipped with semi-cylindrical vanes 19 positioned at an incline thereover as shown in FIGS. 1 and 2. The vanes 19 are adapted to have oscillatory movement imparted thereto by any convenient means and serve to fold the milk caramel mass and shape it into a multilayer stick 22 (FIG. 3), which is then passed between two rotatable cooled rolls 21 driven in any suitable manner to produce a caramel stick of a rectangular cross section.

Then, the milk caramel stick is fed by an elevating band conveyor 23 onto a distributing conveyor 24 over which is hinged a carriage 25 which turns freely relative to the vertical axis and directs the caramel stick to the corresponding molding and wrapping machine. On the free end of the carriage 25 a cut-off knife 26 is hinged to cut the caramel stick 22 into the desired lengths. The knife can be operated in any convenient fashion. The stick is directed with the aid of guide flanges 27 to the corresponding molding and wrapping machines via guide chutes 28 and 28a.

The plant may also be employed for making a milk caramel mass of crystalline structure. For this purpose it is provided with a pump 29 (FIG. 1) through which the heated condensed mass is passed once or several times thus resulting in the partial crystallization of the mass.

What we claim is:

1. A method of making a milk caramel mass for manufacturing "Iris" toffee-type candy, wherein a mixture of ingredients required for making the mass which is preheated to a temperature of 60 to 70° C. is stirred and heated to a temperature of 100 to 125° C. while said mixture is circulating continuously through a collector provided with a stirrer and through a heater wherein said mixture is heated again by steam under super atmospheric pressure of about 3.5 atmospheres and evaporated by the heat accumulated in said mixture during its passage through said heater down to a moisture content of 6 to 8 percent in a cyclone steam-separator; the mass so formed being blended with flavoring matter, fed onto a cooling device, shaped into a stick which is passed between rolls to form said stick to the desired shape, cut, and directed to molding and wrapping machines.

2. An apparatus for making a milk caramel mass in manufacturing "Iris" toffee-type candy, comprising a collector provided with a stirrer and to which a preheated mixture of caramel mass components is fed, a unit having a coil for heating said mixture, said unit being connected through a pump with said collector into a closed recirculating system, a coil-type heat exchanger for heating said mixture and evaporating said mixture which is connected through a pump with said collector, a centrifugal cyclone steam separator provided with a pipe for vapor evacuation, a hopper into which said mixture is fed from the cyclone steam separator, said hopper having a lateral slot in the bottom thereof, a device provided with a nozzle for spraying a flavoring material onto said mixture as it is fed from said separator before said mixture enters said hopper, a cooling device consisting of a cooling cylinder and a cooled inclined plate, said plate being provided with swingable vanes for shaping said mass into a multilayer stick, rolls between which the stick passes for forming said stick to the desired shape, a conveyor receiving the shaped stick from said rolls, a carriage disposed over said conveyor, a swingable knife carried by said carriage for cutting said stick and flange means operably related to said conveyor for directing the cut stick pieces to wrapping machines.

References Cited
UNITED STATES PATENTS

| | | | |
|---|---|---|---|
| 2,507,477 | 9/1950 | MacDonald et al. | 107—54 |
| 3,009,427 | 11/1961 | Bell | 107—54 |
| 3,125,037 | 11/1964 | Johnston | 107—54 X |
| 3,131,652 | 5/1964 | Johnston et al. | 107—47 |

WALTER A. SCHEEL, *Primary Examiner.*

J. SHEA, *Assistant Examiner.*